US009088636B2

(12) United States Patent
Doyle et al.

(10) Patent No.: US 9,088,636 B2
(45) Date of Patent: Jul. 21, 2015

(54) QUALITY OF SERVICE (QOS) BASED PLANNING IN WEB SERVICES AGGREGATION

(71) Applicant: International Business Machines Corporation, Armonk, NY (US)

(72) Inventors: Ronald P. Doyle, Raleigh, NC (US); David L. Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/184,825

(22) Filed: Feb. 20, 2014

(65) Prior Publication Data
US 2014/0173107 A1 Jun. 19, 2014

Related U.S. Application Data

(62) Division of application No. 11/238,615, filed on Sep. 29, 2005, now Pat. No. 8,676,974.

(51) Int. Cl.
*G06F 15/173* (2006.01)
*H04L 29/06* (2006.01)
*H04L 29/08* (2006.01)

(52) U.S. Cl.
CPC ............. *H04L 65/80* (2013.01); *H04L 67/02* (2013.01); *H04L 67/322* (2013.01)

(58) Field of Classification Search
CPC ............. H04L 29/08144; H04L 29/06; H04L 29/08072; H04L 12/2465; H04L 12/2487; H04L 2012/5638; H04L 29/08792; H04L 41/5003; H04L 45/302; H04L 67/322; H04L 47/6215; H04L 47/6295; H04L 47/805; H04L 65/80
See application file for complete search history.

(56) References Cited

U.S. PATENT DOCUMENTS

| 6,327,618 B1 | 12/2001 | Ahlstrom et al. |
| 6,466,984 B1 | 10/2002 | Naveh et al. |

(Continued)

FOREIGN PATENT DOCUMENTS

CN 1662899 8/2005

OTHER PUBLICATIONS

Zeng,L.,et al, QoS-Aware Middleware for Web Services Composition, IEEE Trans. on Software Engineering, May 2004, vol. 30, No. 5, p. 311-327.

*Primary Examiner* — Jude Jean Gilles
*Assistant Examiner* — Jaren M Means
(74) *Attorney, Agent, or Firm* — Steven M. Greenberg, Esq.; CRGO LAW

(57) ABSTRACT

Embodiment of the present invention include a method, system and computer program product for a data processing system for QoS based planning in a Web services aggregation. The system can include Web service aggregation and coordination logic configured to identify accessible Web services in a registry and to arrange an aggregation of the Web services for invocation responsive to requests received from communicatively coupled clients over a computer communications network. The system further can include QoS planning logic coupled to the Web service aggregation and coordination logic. The QoS planning logic can be enabled to measure both the individual performance of the Web services in an aggregation of Web services and also the cumulative performance of the aggregation of Web services. Finally, the QoS planning logic can be enabled to modify the aggregation of Web services responsive to measuring both of the individual performance of Web services in the aggregation of Web services and also of the cumulative performance of the aggregation of Web services.

8 Claims, 2 Drawing Sheets

(56) References Cited

U.S. PATENT DOCUMENTS

| | | |
|---|---|---|
| 6,502,131 B1 * | 12/2002 | Vaid et al. .................... 709/224 |
| 2002/0054578 A1 | 5/2002 | Zhang et al. |
| 2002/0143981 A1 | 10/2002 | De Lima et al. |
| 2003/0039237 A1 | 2/2003 | Forslow |
| 2003/0204622 A1 | 10/2003 | Blizniak et al. |
| 2004/0030777 A1 | 2/2004 | Reedy et al. |
| 2004/0139154 A1 | 7/2004 | Schwarze |
| 2006/0036752 A1 | 2/2006 | Lei et al. |

* cited by examiner

QUALITY OF SERVICE (QOS) BASED PLANNING IN WEB SERVICES AGGREGATION

CROSS-REFERENCE TO RELATED APPLICATIONS

This application claims priority to U.S. patent application Ser. No. 11/238,615, filed Sep. 29, 2005, the entirety of which is incorporated herein by reference.

BACKGROUND OF THE INVENTION

1. Field of the Invention

The present invention relates to the field of distributed computing, and more particularly to Web services.

2. Description of the Related Art

Web services represent the leading edge of distributed computing and are viewed as the foundation for developing a truly universal model for supporting the rapid development of component based applications over the World Wide Web. Web services are known in the art to include a stack of emerging standards that describe a service oriented, component based application architecture. Specifically, Web services are loosely coupled, reusable software components that semantically encapsulate discrete functionality and are distributed and programmatically accessible over standard Internet protocols.

Conceptually, Web services represent a model in which discrete tasks within processes are distributed widely throughout a value net. Notably, many industry experts consider the service oriented Web services initiative to be the next evolutionary phase of the Internet. Typically, Web services can be defined by an interface such as the Web services definition language (WSDL), and can be implemented according to the interface, though the implementation details matter little so long as the implementation conforms to the Web services interface. Once a Web service has been implemented according to a corresponding interface, the implementation can be registered with a Web services registry, such as Universal Description, Discover and Integration (UDDI), as is well known in the art. Upon registration, the Web service can be accessed by a service requestor through the use of any supporting messaging protocol, including for example, the simple object access protocol (SOAP).

Generally, in a distributed environment, the vast majority of Web services process requests indiscriminately. That is, regardless of the end-user, each request can be processed with equal priority. Given the exponential increase in requests for Web services across the Internet, however, some Web services provide for varying levels of responsiveness based upon what has been referred to as a "policy based service differentiation model". In a policy based service differentiation model, Web services can offer many levels of responsiveness and performance depending upon administratively defined policies. In that regard, quality of service (QoS) terms in a service level agreement (SLA) specify a level of responsiveness minimally owed to particular requestors.

As Web services have grown from a novel technical concept to an accepted method for advertising and accessing distributed logic, application builders and developers have begun to compose applications as aggregations of Web services. To date, Web services have offered Quality of Service (QoS) guarantees for respective individual functions, but the problem of overall application QoS when using Web services in an application has fallen outside of scope.

BRIEF SUMMARY OF THE INVENTION

Embodiments of the present invention address deficiencies of the art in respect to Web services aggregation and provide a novel and non-obvious method, system and computer program product for QoS based planning in a Web services aggregation. In one embodiment, a computer-implemented method for QoS based planning in a Web services aggregation can include measuring both the individual performance of Web services in an aggregation of Web services and also the cumulative performance of the aggregation of Web services. The method further can include modifying the aggregation of Web services responsive to the measuring both of the individual performance of Web services in the aggregation of Web services and also of the cumulative performance of the aggregation of Web services.

Measuring both the individual performance of Web services in the aggregation of Web services and also the cumulative performance of the aggregation of Web services can include obtaining a performance goal for the aggregation of Web services, and comparing a cumulated performance of the aggregation of Web services to the obtained performance goal to determine whether or not to modify the aggregation of Web services. In one aspect of the embodiment, modifying of the aggregation of Web services can include changing an order of invocation of the Web services in the aggregation of Web services to accommodate a measured performance deficiency for a single one of the Web services in the aggregation. In another aspect of the embodiment, modifying the aggregation of Web services can include changing an order of invocation of the Web services in the aggregation of Web services to capitalize upon a measured cumulative out-performance for the aggregation.

In another embodiment of the invention, a data processing system for QoS based planning in a Web services aggregation can include Web service aggregation and coordination logic configured to identify accessible Web services in a registry and to arrange an aggregation of the Web services for invocation responsive to requests received from communicatively coupled clients over a computer communications network. The system further can include QoS planning logic coupled to the Web service aggregation and coordination logic. The QoS planning logic can be enabled to measure both the individual performance of the Web services in an aggregation of Web services and also the cumulative performance of the aggregation of Web services. Finally, the QoS planning logic can be enabled to modify the aggregation of Web services responsive to measuring both of the individual performance of Web services in the aggregation of Web services and also of the cumulative performance of the aggregation of Web services.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodi

DETAILED DESCRIPTION OF THE INVENTION

Embodiments of the present invention provide a method, system and computer program product for QoS based planning in Web services aggregation. In accordance with an embodiment of the present invention, a performance goal can be identified for an aggregation of Web services, whether the aggregation is that of actively accessible Web services in a run-time environment, or whether the aggregation is that of prospectively accessible Web services in the development environment. Subsequently, the performance of individual Web services in the aggregation can be measured and compared to the identified performance goal. In consequence, the selection of the individual Web services in the aggregation can be adjusted to meet the identified performance goal for the aggregation.

Figure 1:
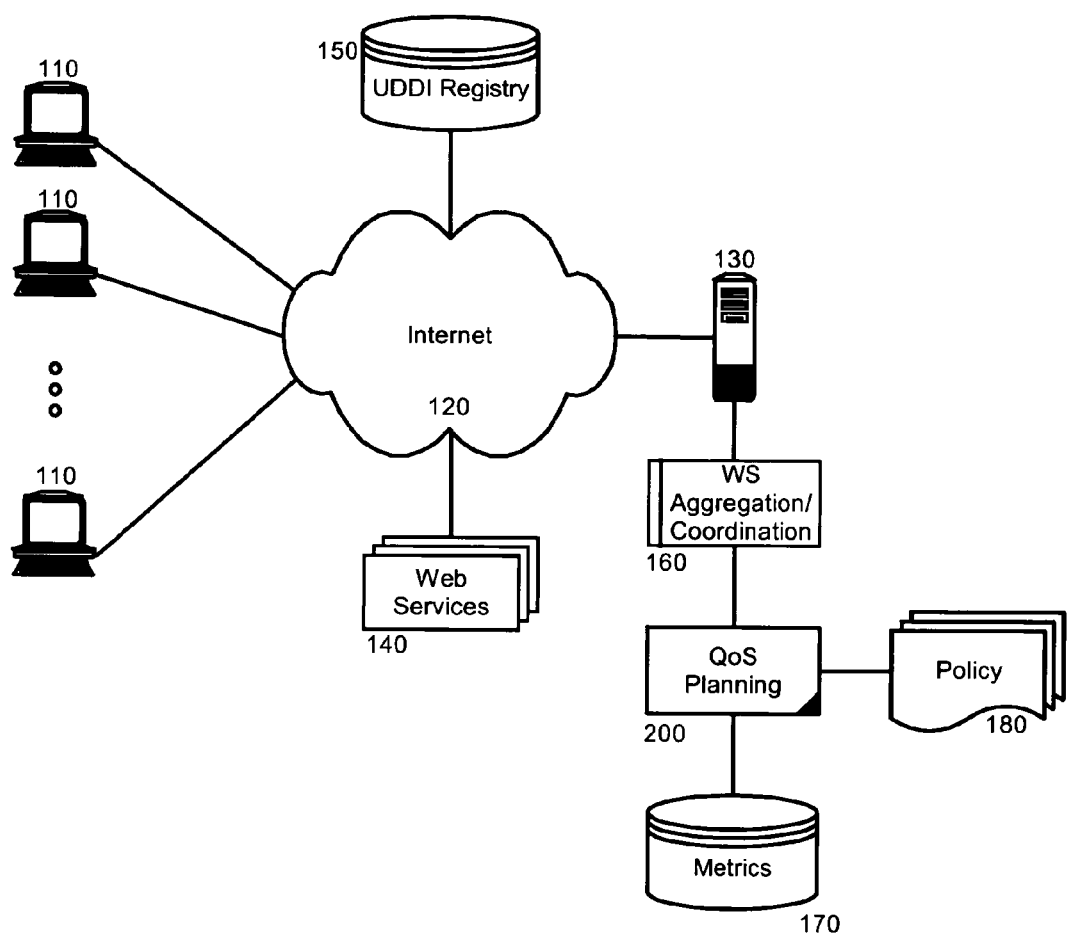
- FIG. 1 is a schematic illustration of a data processing system configured for QoS based planning in Web services aggregation; and, FIG. 2 is a flow chart illustrating a method for QoS based planning in Web services aggregation.

In further illustration, FIG. 1 is a schematic illustration of a data processing system configured for QoS based planning in Web services aggregation. As shown in FIG. 1, the data processing system can include a server computing device 130 configured for coupling to one or more client computing devices 110 over a computer communications network 120. The server computing device 130 further can be configured to access one or more Web services 140 by reference to a registry 150 over the computer communications network 120.

Notably, the server computing device 130 can include Web services aggregation and coordination logic 160. Web services aggregation and coordination logic 160 can include program code enabled to assemble a set of Web services 140 in an aggregation to satisfy a request for an aggregate computing service received from the client computing devices 110 over the computer communications network 120. Web services aggregation and coordination logic is well-known in the art and is often referred to as dynamic Web services aggregation and orchestration.

In accordance with the present invention, QoS planning logic 200 can be coupled to the Web services aggregation and coordination logic 160. The QoS planning logic 200 can include program code enabled to modify an arrangement of the Web services 140 in the aggregation in order to meet a performance goal specified by a performance policy 180. In this regard, the program code of the QoS planning logic 200 can be enabled to measure and capture performance metrics 170 for the Web services 140 in the aggregation. The performance metrics 170 can be compared to the performance goal or goals of the performance policy 180 to determine whether the arrangement of the Web services 140 in the aggregation need be modified.

Figure 2:
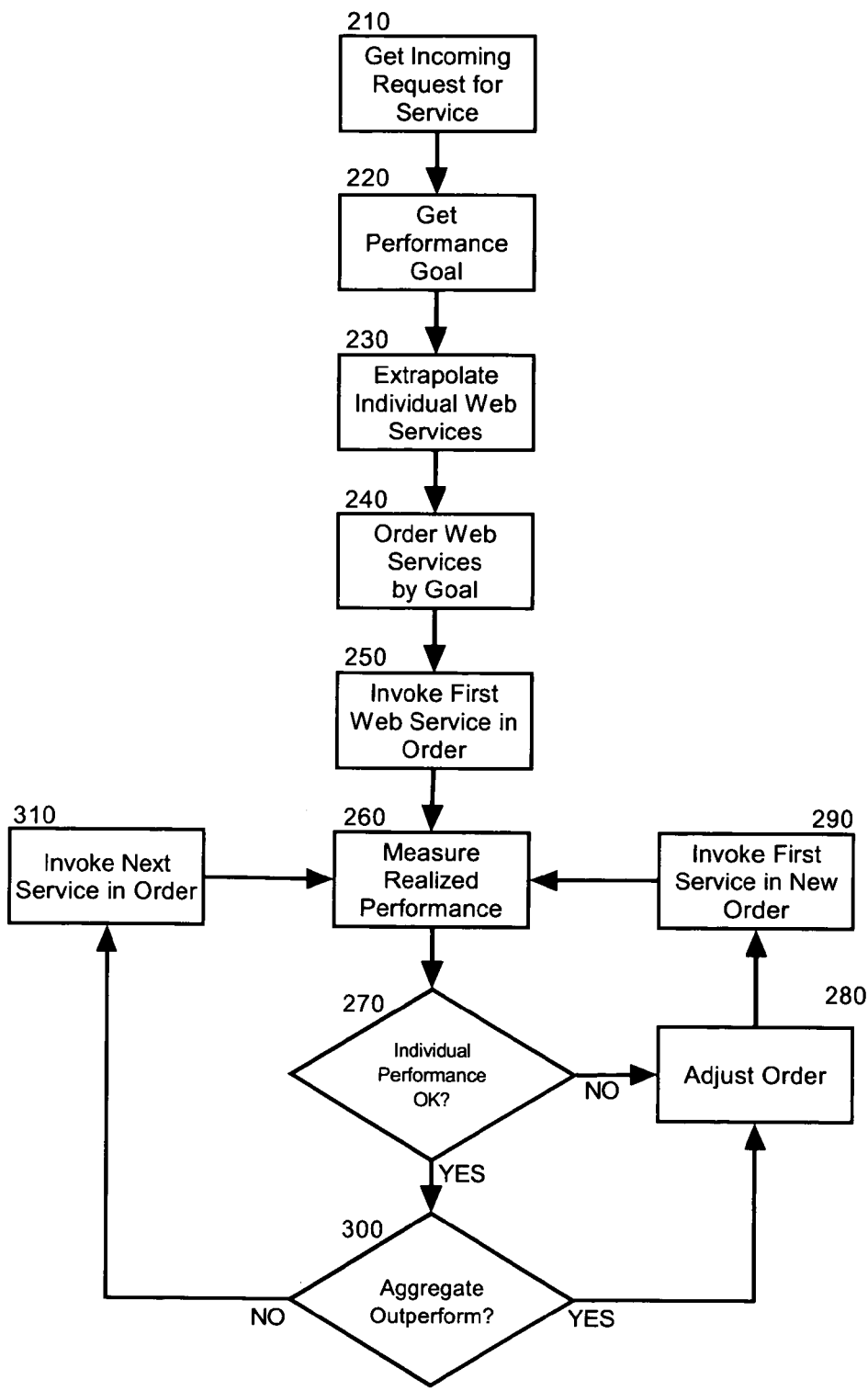

In more particular illustration, FIG. 2 is a flow chart illustrating a method for QoS based planning in Web services aggregation. As shown in FIG. 2, in block 210, an incoming request for service can be received which implicates an aggregation of Web services. In block 220, a performance goal for the aggregation of Web services can be obtained. Also, in block 230, individual Web services to be included in the aggregation can be extrapolated from the request for service.

In this regard, a sufficient selection of accessible Web services can be identified which when aggregated can satisfy the request for service.

In block 240, the extrapolated Web services can be ordered according to performance goal. Specifically, the expected responsiveness of each of the extrapolated Web services in the aggregation can be determined and the Web services can be ordered so as to permit the incremental monitoring of the responsiveness of the Web services upon invocation. The incremental monitoring of the responsiveness of the Web services can provide the ability to adjust the order of invocation of the Web services to meet any unexpected performance shortfalls or where the performance of the aggregate exceeds expectations.

In this regard, in block 250, a first Web service in the order can be invoked and in block 260, the performance of the invoked Web service can be measured. In decision block 270, it can be determined whether the performance of the invoked Web service is satisfactory. If not, in block 280 the ordering of the Web services can be adjusted to account for the performance deficiency of the invoked Web service and in block 290, the first Web service in the new ordering can be invoked. Subsequently, the process of blocks 260 through 270 can repeat for the newly invoked Web service. Otherwise, the process can continue through decision block 300.

In decision block 300, it can be determined whether the aggregation of Web services has cumulatively outperformed expectations relative to the performance goal. If not, the next Web service in the order can be invoked. However, if the aggregation of Web services has cumulatively outperformed expectations relative to the performance goal, whether the performance of the invoked Web service is satisfactory. If not, in block 280 the ordering of the Web services can be adjusted to account for the unexpected performance of the aggregation and in block 290, the first Web service in the new ordering can be invoked. Subsequently, the process of blocks 260 through 300 can repeat for the newly invoked Web service.

Thus, in accordance with the present invention, the ordering of invocation of the Web services in the aggregation can be dynamically adjusted not only based upon the measured performance of each individual Web service in the aggregation, but also based upon the performance of the aggregation. Moreover, the adjustment of the ordering can occur both in the circumstance where individual Web services have not met performance expectations, and also where the aggregation has exceeded performance expectations. In the latter circumstance, the dynamically measured performance advantage can be leveraged to accommodate subsequent performance deficiencies without requiring a corresponding adjustment in the ordering.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer-implemented method for Quality of Service (QoS) based planning in a Web services aggregation comprising:

measuring both the individual performance of Web services in an aggregation of Web services and also the cumulative performance of the aggregation of Web services; and, modifying the aggregation of Web services responsive to the measuring both of the individual performance of Web services in the aggregation of Web services and also of the cumulative performance of the aggregation of Web services by changing an order of invocation of the Web services in the aggregation of Web services to accommodate a measured performance deficiency for a single one of the Web services in the aggregation, wherein the measuring both of the individual performance of Web services in the aggregation of Web services and also of the cumulative performance of the aggregation of Web services, comprises:

obtaining a performance goal for the aggregation of Web services; and, comparing a cumulated performance of the aggregation of Web services to the obtained performance goal to determine whether or not to modify the aggregation of Web services.

2. The method of claim 1, wherein the modifying of the aggregation of Web services, comprises changing an order of invocation of the Web services in the aggregation of Web services to capitalize upon a measured cumulative out-performance for the aggregation.

3. The method of claim 1, wherein the modifying of the aggregation of Web services, comprises:

first changing an order of invocation of the Web services in the aggregation of Web services to accommodate a measured performance deficiency for a single one of the Web services in the aggregation; and, second changing an order of invocation of the Web services in the aggregation of Web services to accommodate a measured cumulative performance deficiency for the aggregation.

4. A data processing system for Quality of Service (QoS) based planning in a Web services aggregation comprising:

Web service aggregation and coordination logic configured to identify accessible Web services in a registry and to arrange an aggregation of the Web services for invocation responsive to requests received from communicatively coupled clients over a computer communications network; and, QoS planning logic coupled to the Web service aggregation and coordination logic and enabled to measure both the individual performance of the Web services in an aggregation of Web services and also the cumulative performance of the aggregation of Web services, and to modify the aggregation of Web services responsive to measuring both of the individual performance of Web services in the aggregation of Web services and also of the cumulative performance of the aggregation of Web servicesservices by changing an order of invocation of the Web services in the aggregation of Web services to accommodate a measured performance deficiency for a single one of the Web services in the aggregation.

5. A computer program product comprising a computer usable medium having computer usable program code for Quality of Service (QoS) based planning in a Web services aggregation, said computer program product including:

computer usable program code for measuring both the individual performance of Web services in an aggregation of Web services and also the cumulative performance of the aggregation of Web services; and, computer usable program code for modifying the aggregation of Web services responsive to the measuring both of the individual performance of Web services in the aggregation of Web services and also of the cumulative performance of the aggregation of Web services by changing an order of invocation of the Web services in the aggregation of Web services to accommodate a measured performance deficiency for a single one of the Web services in the aggregation.

6. The computer program product of claim 5, wherein the computer usable program code for measuring both of the individual performance of Web services in the aggregation of Web services and also of the cumulative performance of the aggregation of Web services, comprises:

computer usable program code for obtaining a performance goal for the aggregation of Web services; and, computer usable program code for comparing a cumulated performance of the aggregation of Web services to the obtained performance goal to determine whether or not to modify the aggregation of Web services.

7. The computer program product of claim 5, wherein the computer usable program code for modifying of the aggregation of Web services, comprises computer usable program code for changing an order of invocation of the Web services in the aggregation of Web services to capitalize upon a measured cumulative out-performance for the aggregation.

8. The computer program product of claim 5, wherein the computer usable program code for modifying of the aggregation of Web services, comprises:

computer usable program code for first changing an order of invocation of the Web services in the aggregation of Web services to accommodate a measured performance deficiency for a single one of the Web services in the aggregation; and, computer usable program code for second changing an order of invocation of the Web services in the aggregation of Web services to accommodate a measured cumulative performance deficiency for the aggregation.

* * * * *